US010316254B2

(12) United States Patent
Molina et al.

(10) Patent No.: US 10,316,254 B2
(45) Date of Patent: Jun. 11, 2019

(54) HYDROTHERMAL SYNTHESIS OF ALKALI PROMOTED MOS2-BASED CATALYST

(71) Applicants: Belinda D. Molina, El Paso, TX (US); Brenda Torres, El Paso, TX (US); Maryam Zarei-Chaleshtori, El Paso, TX (US); Russell R. Chianelli, El Paso, TX (US); Tracy Benson, Beaumont, TX (US); Mahsa Hosseini, El Paso, TX (US)

(72) Inventors: Belinda D. Molina, El Paso, TX (US); Brenda Torres, El Paso, TX (US); Maryam Zarei-Chaleshtori, El Paso, TX (US); Russell R. Chianelli, El Paso, TX (US); Tracy Benson, Beaumont, TX (US); Mahsa Hosseini, El Paso, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 15/522,644

(22) PCT Filed: Oct. 31, 2015

(86) PCT No.: PCT/US2015/058526
§ 371 (c)(1),
(2) Date: Apr. 27, 2017

(87) PCT Pub. No.: WO2016/070161
PCT Pub. Date: May 6, 2016

(65) Prior Publication Data
US 2017/0335201 A1    Nov. 23, 2017

Related U.S. Application Data

(60) Provisional application No. 62/073,799, filed on Oct. 31, 2014.

(51) Int. Cl.
| | |
|---|---|
| *B01J 27/043* | (2006.01) |
| *C10G 2/00* | (2006.01) |
| *B01J 27/051* | (2006.01) |
| *B01J 37/00* | (2006.01) |
| *B01J 37/06* | (2006.01) |
| *C01G 39/06* | (2006.01) |
| *C01G 51/00* | (2006.01) |

(52) U.S. Cl.
CPC ............ *C10G 2/332* (2013.01); *B01J 27/051* (2013.01); *B01J 27/0515* (2013.01);
(Continued)

(58) Field of Classification Search
CPC .... B01J 27/043; B01J 27/051; B01J 27/0515; B01J 37/009; B01J 37/06; C10G 2/332; C10G 2/33; C01G 39/06; C01G 51/30
(Continued)

(56) References Cited

U.S. PATENT DOCUMENTS 4,430,442 A * 2/1984 Sawyer .................. B01J 27/051
423/56
4,590,314 A * 5/1986 Kinkade ................. C07C 29/16
502/220

(Continued)

FOREIGN PATENT DOCUMENTS

WO    85/03073    *  7/1985    ............. C07C 29/15

OTHER PUBLICATIONS

International Search Report and Written Opinion in International Application No. PCT/US2015/058526 dated Jan. 19, 2016.
(Continued)

*Primary Examiner* — Patricia L. Hailey
(74) *Attorney, Agent, or Firm* — Norton Rose Fulbright US LLP (57) ABSTRACT

Certain embodiments are directed to method for making and using an alkali promoted transition metal sulfide Fischer
(Continued)

Tropsch catalyst. Certain embodiments are directed to alkali promoted transition metal sulfide Fischer Tropsch catalyst synthesized using steps comprising (i) mixing an ammonium tetrathiomolybdate (ATM) precursor compound with an alkali metal compound and molybdenum disulfide in deionized water to form a reaction mixture, (ii) heating the reaction mixture at a temperature of at least 200, 250, 300, 350, 400C at a pressure of at lease 900, 1000, 1100, 1500, 2000 psi for more than 0.5 1, 1.5, 2.0, 3 or more hours to form a reaction product, (iii) filtering, washing, and drying the reaction product.

13 Claims, 11 Drawing Sheets

(52) U.S. Cl.
CPC .............. *B01J 37/009* (2013.01); *B01J 37/06* (2013.01); *C01G 39/06* (2013.01); *C01G 51/30* (2013.01); *C10G 2/33* (2013.01)

(58) Field of Classification Search
USPC .................. 502/216, 220, 221; 518/714, 715
See application file for complete search history.

(56) References Cited

U.S. PATENT DOCUMENTS

| | | | | |
|---|---|---|---|---|
| 4,675,344 | A * | 6/1987 | Conway | C07C 29/153 |
| | | | | 502/219 |
| 5,817,903 | A | 10/1998 | Wu | 585/486 |
| 5,945,371 | A | 8/1999 | Wu | 502/307 |
| 7,223,713 | B2 | 5/2007 | Alonso | 502/177 |
| 7,709,541 | B2 | 5/2010 | Lu | 518/718 |
| 7,923,405 | B2 * | 4/2011 | Kharas | B01J 23/85 |
| | | | | 502/216 |
| 8,354,357 | B2 * | 1/2013 | Kharas | B01J 23/85 |
| | | | | 502/216 |
| 8,383,691 | B2 | 2/2013 | Kharas | 518/714 |
| 8,399,715 | B2 | 3/2013 | Kharas | 568/840 |
| 2005/0059545 | A1 * | 3/2005 | Alonso | B01J 27/051 |
| | | | | 502/220 |

OTHER PUBLICATIONS

International Preliminary Report on Patentability in International Application No. PCT/US2015/058526 dated May 11, 2017.

* cited by examiner

HYDROTHERMAL SYNTHESIS OF ALKALI PROMOTED MOS2-BASED CATALYST

BACKGROUND

Synthesis gas, i.e., hydrogen ($H_2$) and carbon oxide(s) (CO), can be converted to hydrocarbons in the presence of a variety of transition metal catalysts. Thus, certain Group VIII metals, particularly iron, cobalt, ruthenium, and nickel, are known to catalyze the conversion of carbon oxide(s) and hydrogen, also referred to as syngas or synthesis gas, to hydrocarbons. Such metal catalysts are commonly called Fischer-Tropsch catalysts. While the use of nickel preferentially produces methane upon conversion of syngas; the use of iron, cobalt, and ruthenium tends to produce hydrocarbon mixtures consisting of hydrocarbons having a larger carbon number than methane. In the Fischer-Tropsch reaction synthesis gas is reacted in the presence of a heterogeneous catalyst to give a hydrocarbon mixture having a relatively broad molecular weight distribution. This product comprises predominantly straight chain saturated hydrocarbons that typically have a chain length of more than 5 carbon atoms. The reaction is highly exothermic and therefore heat removal is one of the primary constraints of all Fischer-Tropsch processes. Whilst most of Fischer-Tropsch reaction developments and knowledge have been made in the field of gas phase reactors, there is a clear tendency in the industry to concentrate now on slurry reactors which are more prone to solve the above heat removal constraints.

There remains a need for additional catalysts and methods to producing such catalyst for Fischer-Tropsch processes.

SUMMARY

Certain embodiments are directed to alkali promoted transition metal sulfide Fischer Tropsch catalyst synthesized using steps comprising (i) mixing an ammonium tetrathiomolybdate (ATM) precursor compound with an alkali metal compound and molybdenum disulfide in deionized water to form a reaction mixture, (ii) heating the reaction mixture at a temperature of at least 200, 250, 300, 350, 400° C. at a pressure of at lease 900, 1000, 1100, 1500, 2000 psi for more than 0.5 1, 1.5, 2.0, 3 or more hours to form a reaction product, (iii) filtering, washing, and drying the reaction product. In certain aspects the starting molar ratio of ATM pecursor:alkali metal:molybdenium was 2, 3, 4, 5, 6, 7, 8, 9, 10 to 0.1, 0.2, 0.3, 0.4, 0.5, 1 to 0.5, 1, 2, 3, 4. In certain aspect the ratio of ATM precursor:alkali metal:molybdenium is 5:0.3:1. In further aspects the ATM precursor is prepared by dissolving heptamolybdate in deionized water, adding ammonium sulfide solution, heating the solution to at least 55° C. for 30 minutes with stirring. In certain aspects the ATM precursor is a bright red ammonium salt that is kept sealed, in solution, and refrigerated to prevent decomposition. In certain aspects the alkali metal is selected from lithium (Li), sodium (Na), potassium (K), rubidium (Rb), cesium (Cs), and francium (Fr). In certain aspects the alkali metal is potassium or cesium.

Certain embodiments are directed to an alkali promoted transition metal sulfide Fischer Tropsch catalyst synthesized using steps comprising, (i) mixing an ATM precursor compound with cobalt nitrate hexahydrate, an alkali metal compound, and molybdenum disulfide in deionized water to form a reaction mixture, (ii) heating the reaction mixture at a temperature of at least 200, 250, 300, 350° C. or more at a pressure above 900, 1000, 1200, 1400, 1600, 2000 or more psi for more that 0.5, 1, 2, 5 or more hours to form a reaction product, (iii) filtering, washing, and drying the reaction product. In certain aspects the starting molar ratio of ATM pecursor:alkali metal:cobalt:molybdenium wasol, 2, 3, 4, 5, 6, 7, 8, 9, 10 to 0.1, 0.2, 0.3, 0.4, 0.5, 0.6, 0.7, 0.8, 0.9, 1 to 0.1, 0.2, 0.3, 0.4, 0.5, 0.6, 0.7, 0.8, 0.9, 1 to 0.5, 1, 2, 3, 4, 5, 6. In certain aspects the ratio is about 5:0.3:0.3:1. In certain further aspects the ATM precursor was prepared by dissolving heptamolybdate in deionized water, adding ammonium sulfide solution, heating the solution above 55° C. for 30 minutes with stirring. The bright red ammonium salt produced was kept refrigerated, sealed, and in solution to prevent decomposition. In certain aspects the alkali metal is selected from lithium (Li), sodium (Na), potassium (K), rubidium (Rb), cesium (Cs), and francium (Fr). In certain aspects the alkali metal is potassium or cesium.

In certain embodiment the Fischer-Tropsch catalyst described herein is placed in a fixed bed reactor. In certain aspects the catalyst coupled to a support, such as an alumina support.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

Fossil fuels have allowed technologies to advance in modern transportation for over a century. Over 80 million barrels of petroleum are processed every day in refineries worldwide to meet the need for liquid transportation fuels such as gasoline, diesel fuel, and jet fuel. Despite the advancement made in upgrading fuel economy of vehicles, world usage of transportation fuels has continued to increase and is assumed to remain high well into the next millennium. Several realities have emerged in the $20^{th}$ century; the potential risks associated with the human emissions into the environment, complex geopolitics, energy security concerns such as the continuous availability of energy in varied forms, in sufficient quantities, and at reasonable prices and eventually the dwindling supply of this essential non-renewable resource.

For an analysis that extends well into the $21^{st}$ century and explores the long-term availability of the dominant fossil fuel, oil, the future production profile of unconventional oil and resources eases many of the aforementioned concerns. Unconventional oil and resources include, but are not limited to, oil shale, heavy crude oil, tar sands (natural bitumen), coal, natural gas, biomass, fuel cell, and oxygenated fuels. U.S. fuel improvement efforts have become focused on using alternative fuels to satisfy the sustainable development objectives of keeping fuels affordable, increasing energy security, and evolving towards near-zero emissions of both air pollutants and greenhouse gases.

Within the last two decades the Fischer-Tropsch Synthesis (FTS) has been the subject of renewed interest especially in Brazil and the United States. FTS is the heart of all gas-to-liquid technologies; it creates higher alcohols and hydrocarbons from synthesis gas or "syngas" (e.g., CO and $H_2$) with the aid of a catalyst. The use of syngas-derived fuels is among the leading candidate fuel for addressing challenges posed by compression-ignition engines. Compression-ignition engines are a major player in transport, whether they are used for buses, trucks, trains and in some regions automobiles as well. The efficiency benefits offered by these engines will be even more important in the future as transport demands grow.

FT products are preferred for synthetic fuels because they are mainly linear thus the quality of the products is very high. With suitable conditions purified synthesis gas used in the FTS yields products that are free of sulfur and nitrogen, making them environmentally friendly. By virtue of their high octane numbered alcohols are interesting as gasoline additives or replacements. Fuel alcohols have many good characteristics, for example outstanding anti-knock properties and good miscibility with gasoline, which make them attractive as octane boosters in gasoline. Mixtures of higher alcohols and methanol are preferred over pure methanol because of their higher water tolerance, reduced fuel volatility, and lower vapor lock tendency; and also because of their volumetric heating values are higher than for pure methanol.

The conversion from carbonaceous feedstock to synthetic fuels is a lengthy process that cannot be completed without the aid of a metal catalyst. The field of catalysis is a key component in the petroleum refining industry. Catalysts aid in the production of clean fuels and are used in refineries around the world every day to meet environmental standards. There is a continuing requirement for development of FTS-catalysts with improved properties to answer today's challenges for alternative fuel supplies.

Alkali-promoted molybdenum sulfides have been shown to be among the most promising catalysts due to their ability to catalyze the reaction with high selectivity towards alcohols as well as being sulfur tolerant. Promoters such as Co, Ni, or Fe are often added to the alcohol catalyst to increase the higher alcohol-to-methanol ratio. Deposition of coke is not a problem for this type of catalyst even when syngas with low $H_2/CO$ ratio is used. This, together with the water-gas-shift activity, makes it suitable for use with syngas derived from coal and biomass gasification.

In certain instances a preferred catalyst is one that catalyzes selective formation of alcohols. In other words, the catalyst should be able to change the thermodynamically controlled process to a kinetically controlled process, which would favor the production of alcohols.

The methods and compositions described herein are directed to the preparation and characterization of alkali promoted transition metal sulfide catalysts for the alcohol production reaction (FT). Catalysts have been or will be tested in conversion of syngas ($CO/H_2$) into alcohol to characterize their activity selectivity and stability in different reaction conditions using a prototype gas to liquid (GTL) technology.

The FTS begins with the production of syngas from carbonaceous feedstock such as: natural gas through steam reforming or partial oxidation, or from coal through $O_2$-blown gasification and even from biomass through gasification. The FTS-based gas to liquids (GTL) technology includes the three processing steps namely syngas generation, syngas conversion and hydroprocessing. Common use of the term "synthetic fuel" is used to describe fuels manufactured via FT conversion. The feedstock is reacted at high temperatures or gasified. After an appropriate cleaning the syngas can then undergo FT conversion, followed by hydrocracking, the breakdown of compounds into simpler molecules, ending with the complete conversion to synthetic fuels, jet fuel, and diesel.

Characterization methods of $K/Li/Cs-MoS_2$ and $K/Li/Cs-CoMoS_2$ catalysts have been carried out through Scanning Electron Microscopy (SEM), Transition Electron Microscopy (TEM), X-Ray Diffraction (XRD) and Energy Dispersive Spectroscopy (EDS). Various characterization methods have been deployed to correlate FTS products versus crystal and morphological properties of these heterogeneous catalysts. A lab scale gas to liquid system can be used to evaluate efficiency in testing FT catalysts for their production of alcohols.

The FT process is a collection of chemical reactions that converts a mixture of carbon monoxide and hydrogen into liquid hydrocarbons. It was first developed by Franz Fischer and Hans Tropsch. The process, a key component of gas to liquids technology, can produce synthetic lubrication oils and/or synthetic fuels, typically from coal, natural gas, or biomass. Syngas or synthesis gas which is a mixture of carbon monoxide and hydrogen can be converted to liquid hydrocarbons and water through a series of reactions collectively called a Fischer Tropsch process. Catalyst used in Fischer-Tropsch (Fischer Tropsch Catalyst) process include a variety of transition metal catalyst particularly of iron, cobalt, ruthenium, and nickel that are known to catalyze conversion of carbon monoxide and hydrogen into liquid hydrocarbons. In Fischer-Tropsch reactions hydrocarbons with relatively broad molecular weight distributions are produced. The reaction is highly exothermic and therefore heat removal is one of the primary constraints of the process.

Certain embodiments are directed to processes for converting synthesis gas to hydrocarbons in the presence of a Fischer-Tropsch catalyst produced using the methods described herein, wherein the process comprises: (a) activating the Fischer-Tropsch catalyst with a reducing gas consisting of hydrogen and inert gas at a temperature between 330 and 400 degrees C., and (b) contacting the activated Fischer-Tropsch catalyst from step (a) with synthesis gas in order to convert the synthesis gas into hydrocarbons.

Catalytic Testing unit (Gas to Liquid Technology—GTL). A prototype gas to liquid system can be used to evaluate FT catalysts for their production of alcohols. The GTL system is designed for continuous flow of reactants and products to mimic the type of reactor found in industry; it simulates coal conversion to synthetic liquid fuels.

The prototype system can use a 1/8" or a 5 mm 316 stainless steel tubing. The reactor can either be 1/4" or 3/8", or its metric equivalent, 316 stainless steel tubing, whichever is preferred for a particular reaction and has a sand filled reactor shell. The reactor is flow controlled and backpressure regulated. The backpressure regulator allows modulation of input and output flow rates (0.1-100 L/min) while maintaining system pressure 1-500 psi.

Figure 1:
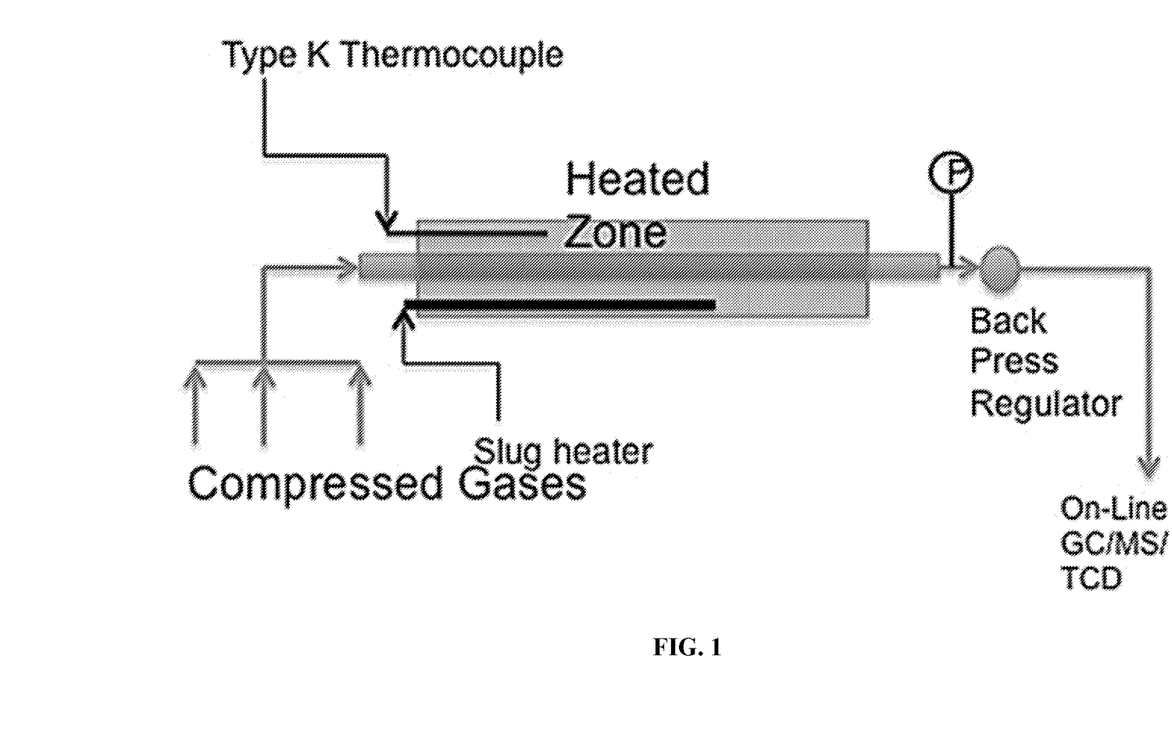
FIG. 1. Illustrates a Gas To Liquid (GTL) schematic.

The reactor is heated using a tube furnace. It has a Type K thermocouple connected to a temperature controller. It ranges in temperatures of 25-500° C. and can achieve temperatures of up to 700° C. However, the reactor tube, which is uncoated stainless steel, is limiting if higher temperatures are necessary. The reactor tube can be coated with an inert coating (FIG. 1).

Catalyst packing of the prototype reactor can be from 0.25 to 100 grams, from the backpressure regulator a split is made to where some of the reaction gases go to a gas chromatograph (GC) instrument, and the rest are vented. Approximately 250 mg of catalyst is used to run each reaction. The evaluation reactions are run for duration of 8 hours. Reaction conditions such as pressure, temperature, time and $H_2$/CO ratio are determined based on running several variations of these parameters. A commercially available FT catalyst is used as a control for comparison to the FT catalysts described herein.

The prototype packed bed reactor is coupled to a gas chromatograph that uses a TCD (thermal conductivity detector) and a GC-FID (flame ionization detector) for analysis of FTS products. Included are temperature-programmed controls, pressure control devices (including back pressure regulator) and hand-operated needle valves for fine control of reactant gases and liquids. This type of reactor/analytical device will yield kinetics (changing of the gas hourly space velocities (GHSVs)) and catalyst robustness (time on stream analysis).

Chromatography can be achieved via two independent columns. In certain aspects TCD uses a carboxen-1010 PLOT column for fixed gas analysis and low molecular weight analytes (methane, ethane, methanol, etc.). The GC-FID uses a Rxi—1 ms (Restek, Inc.) column is used for analysis of compounds that are 50-500 molecular masses (i.e. olefins, paraffins, alcohols, ect.).

Spent catalyst versus "fresh" catalyst's crystal and morphological characteristics are analyzed using x-ray diffraction, scanning electron microscopy, transmission electron microscopy, electron dispersive spectroscopy, and BET porosity and surface analysis.

Figure 11:
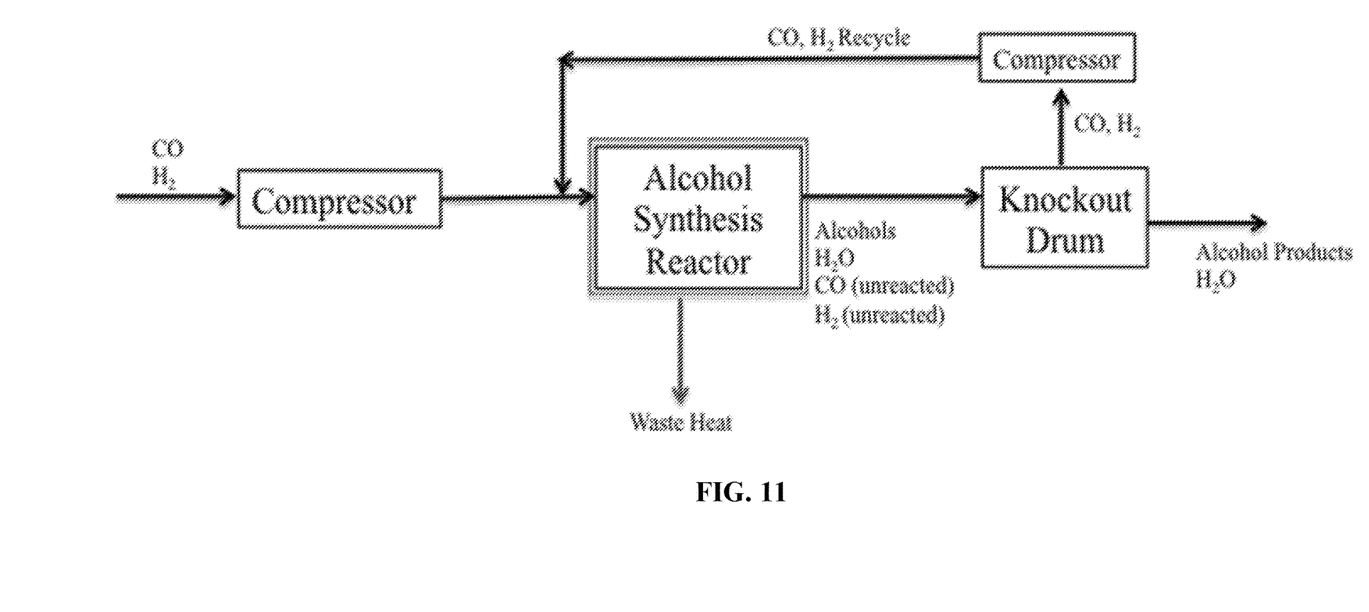
FIG. 11. Is a process flow diagram (PFD) that includes the reactor for alcohol synthesis and a downstream knockout drum (also called a flash distillation column or a knockout pot) to separate the unreacted synthesis gas from the alcohol products.

A process flow diagram (PFD)(FIG. 11) was constructed that includes the reactor for alcohol synthesis and a downstream knockout drum (also called a flash distillation column or a knockout pot) to separate the unreacted synthesis gas from the alcohol products. The unreacted synthesis gas is recycled back to the reactor. Since the production of long chain alcohols is an exothermic reaction, waste heat can be collected by means of a series of heat exchangers and reused within a chemical production facility that requires heat, such as a steam methane reformer. In a chemical production facility where gases are employed as the major reactants, reactions carried out at higher pressures generally result in higher conversions of reactant to product but require higher capital and operating costs.

EXAMPLES

The following examples as well as the figures are included to demonstrate certain embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Catalyst Development/Preparation. Sulfides of transition metals have been used in the petroleum industry for hydrodesulfurization, hydrodenitrogenation, and hydrogenation reactions for over 50 years. One focuse of current research is synthesizing novel heterogeneous catalysts that have desirable physical and chemical properties for synthetic transportation liquid fuel production. Hydrothermal techniques offer several advantages, like homogeneous precipitation using metal chelates under hydrothermal conditions, decomposition of hazardous and/or refractory chemical substances, and a host of other environmental engineering and chemical engineering issues dealing with recycling of rubbers and plastics (instead of burning), and so forth. Although hydrothermal technology was first utilized in the mid-1970s, there are only a few publications related to hydrothermal methods to develop heterogeneous unsupported alkali-promoted transition metal sulfide Fischer-Tropsch bulk catalysts for the production of alcohols. Bulk catalysts are mainly comprised of active substances. Important examples include silica-alumina for hydrocarbon cracking, Zn—Cr oxide catalyst for the conversion of CO—$H_2$ mixtures to methanol and iron-molybdate for methanol oxidation.

As described herein Fischer-Tropsch (FT) catalysts have been synthesized using a hydrothermal method. Two series of alkali promoted transition metal sulfide catalysts K/Li/Cs—$MoS_2$ and K/Li/Cs—$CoMoS_2$ have been synthesized and the catalyst promotional effects have been compared to that of $MoS_2$ and $CoMoS_2$ catalysts.

Synthesis begins by preparing an ammonium tetrathiomolybdate (ATM) precursor. The synthesis of ammonium thiomolybdate (ATM) was reported by Kruss in 1884, later, Alonso et al. described an improved method for synthesize of ATM. This method is as follows: Ammonium heptamolybdate (12.5 grams) is dissolved in 60 ml of deionized water, then 100 ml of ammonium sulfide is added to this solution. The solution is heated to 55° C., the temperature maintained for 30 minutes while stirring on a hot plate. The products are a bright red ammonium salt that is sealed, kept in solution to prevent decomposition and stored in a refrigerator. The reaction is as follows:

$$20H_2O+(NH_4)_6Mo_7O_{24}+4H_2O+28(NH_4)_2S \rightarrow 7[(NH_4)_2 MoS_4]+48\ NH_4OH$$

Synthesis for K/Li/Cs-$MoS_2$ begins by weighing out the alkali compounds (with a ratio of 0.3 mole of alkali metal to 1 mole of molybdenum at 5.00 grams of ATM). The ATM is filtered through vacuum filtration to collect 5.00 grams. The calculated masses of the alkali compounds are listed in Table 1 below.

TABLE 1

Mass of the alkali compounds on a 0.3 mol X to 1 mol Mo ratio at 5.00 grams of ATM. (X = alkali metal)

| Compound | Mass (grams) |
|---|---|
| Potassium Carbonate | 0.40 g |
| Lithium Hydroxide | 0.14 g |
| Cesium Acetate | 1.10 g |
| ATM | 5.00 g |

All compounds are mixed in an aqueous solution. Five grams of ATM is dissolved in 50 mL of DI water, the alkali compound is dissolved separately in 10 mL of DI water then mixed together under stirring for 15 minutes. The reactions are as follows:

$$K_2CO_3+(NH_4)_2MoS_4 \rightarrow K_2MoS_4+NH_3+CO_2$$

$$LiOH+(NH_4)_2MoS_4 \rightarrow LiMoS_4+NH_3+H_2O$$

$$CH_3CO_2Cs+(NH_4)_2MoS_4 \rightarrow Cs_2MoS_4$$

Synthesis for the K/Li/Cs—$CoMoS_2$ series begins by weighing out the alkali compounds and the cobalt nitrate hexahydrate (with a ratio of 0.3 mole of alkali metal to 1 mole of molybdenum and 0.5 mole of cobalt to 1 mole of molybdenum). The ATM is filtered through vacuum filtration to collect 5.00 grams. The calculated masses of the alkali compounds and the cobalt nitrate hexahydrate are listed in Table 2 below.

TABLE 2

Mass of the alkali compounds based on a 0.3 mol X and .5 mol Co to 1 mol Mo ratio at 5.00 grams of ATM. (X = alkali metal)

| Compound | Mass (grams) |
|---|---|
| Potassium Carbonate | 0.40 g |
| Lithium Hydroxide | 0.14 g |
| Cesium Acetate | 1.10 g |
| Cobalt Nitrate Hexahydrate | 2.80 g |
| ATM | 5.00 g |

All compounds are mixed in aqueous solution. Five grams of ATM is dissolved in 50 mL of DI water, each alkali compound is dissolved separately in 10 mL of DI water then mixed under stirring for 15 minutes. The cobalt nitrate hexahydrate is then dissolved in 10 mL of DI water and added to the mixture last, under stirring for another 15 minutes. The $CoMoS_2$ catalyst is synthesized in a similar method with the ratio of 0.5 mole of cobalt to 1 mole of molybdenum and the $MoS_2$ was synthesized at 5.00 grams of ATM.

The mixed solution is then transferred to a 60 mL glass quartz liner and placed inside a high-pressure batch reactor, e.g., a parr model 4540. The contents are incubated for 2 hours at 300° C. reaching pressures of 1300 psi. After the hydrothermal process takes place each catalyst is filtered via vacuum filtration, washed using isopropanol and dried in a desiccator.

Reactions were ran using catalyst #260, better known as B5, $Co_{0.5}MoS_2$. This catalyst is being used as the "control" catalyst. Two parameters can be altered for each test reaction, pressure and $H_2$/CO ratio. According to FT literature these two parameters play a key role in attaining FT products.

Figure 2:
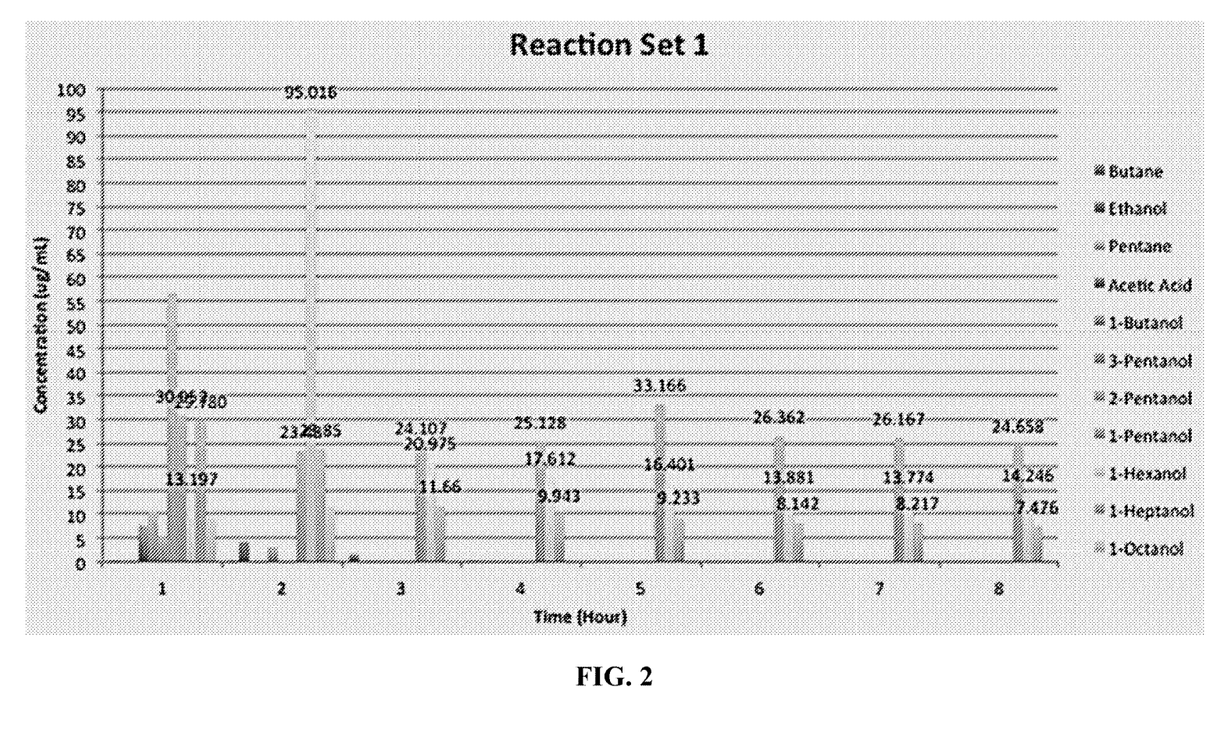
FIG. 2. Illustrates an example of results achieved using Reaction 1 conditions described below.

Reaction 1: Catalyst 260 $Co_{0.5}MoS_2$ Catalyst 260 (pressure 200 psi, temperatue 300 degree C., Ratio H2/CO:0.8/1.0, FIG. 2). Three alcohols were predominately present over the 8 hr period, 1-pentanol, 1-hexanol, and 1-heptanol. 1-Pentanol was present in the highest concentration throughout an 8 hour period. The $1^{st}$ hour resulted in production of 1-butanol, 3-pentanol, 1-octanol and 2-Pentanol, however, there is little to no detection of these compounds after the first hour.

Figure 3:
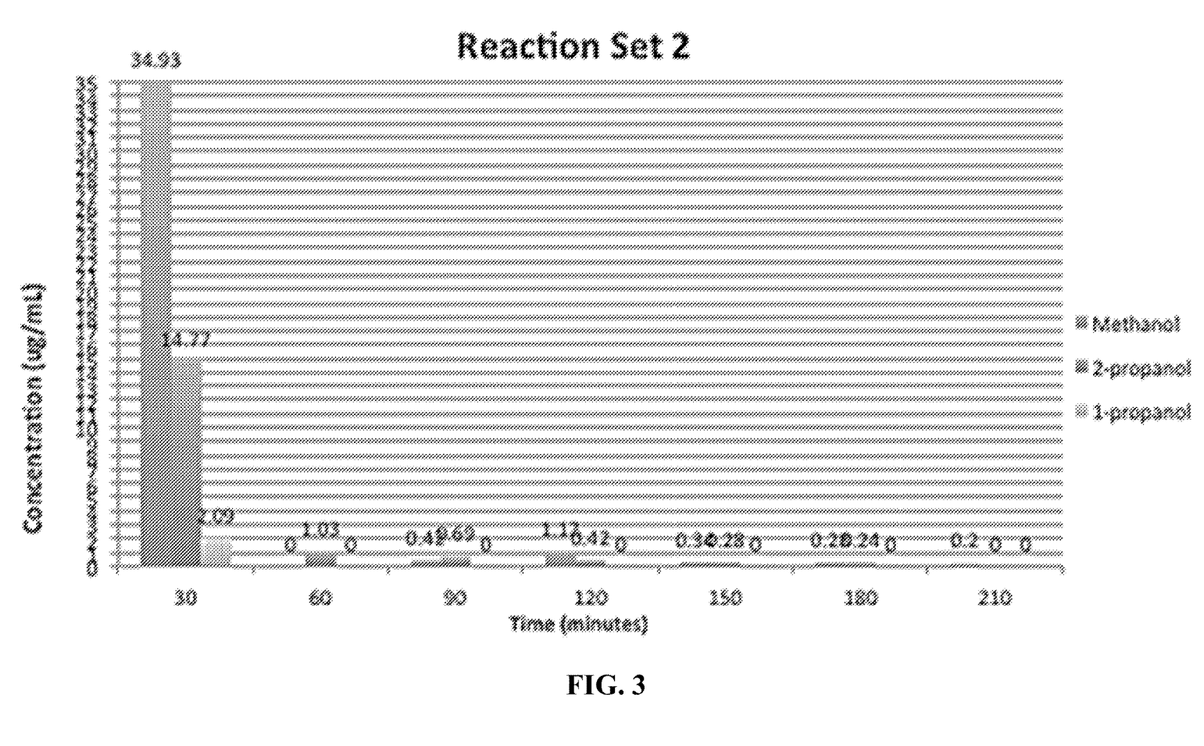
FIG. 3. Illustrates an example of results achieved using Reaction 2 conditions described below.

Reaction 2: Catalyst 260 $Co_{0.5}MoS_2$ (data for 3.5 hours) ($H_2$/CO:1/1, pretreatment 1 hour, pressure 200 psi, temperature 300 degree C., GHSV 5000 mL/(gcat*hr)). The three alcohols (methanol, 2-propanol, and 1-propanol) were detected at the highest concentration within the first 30 minutes. The three hours that follow concentrations of >1.5 μg/mL were detected for methanol and 2-propanol.

Figure 4:
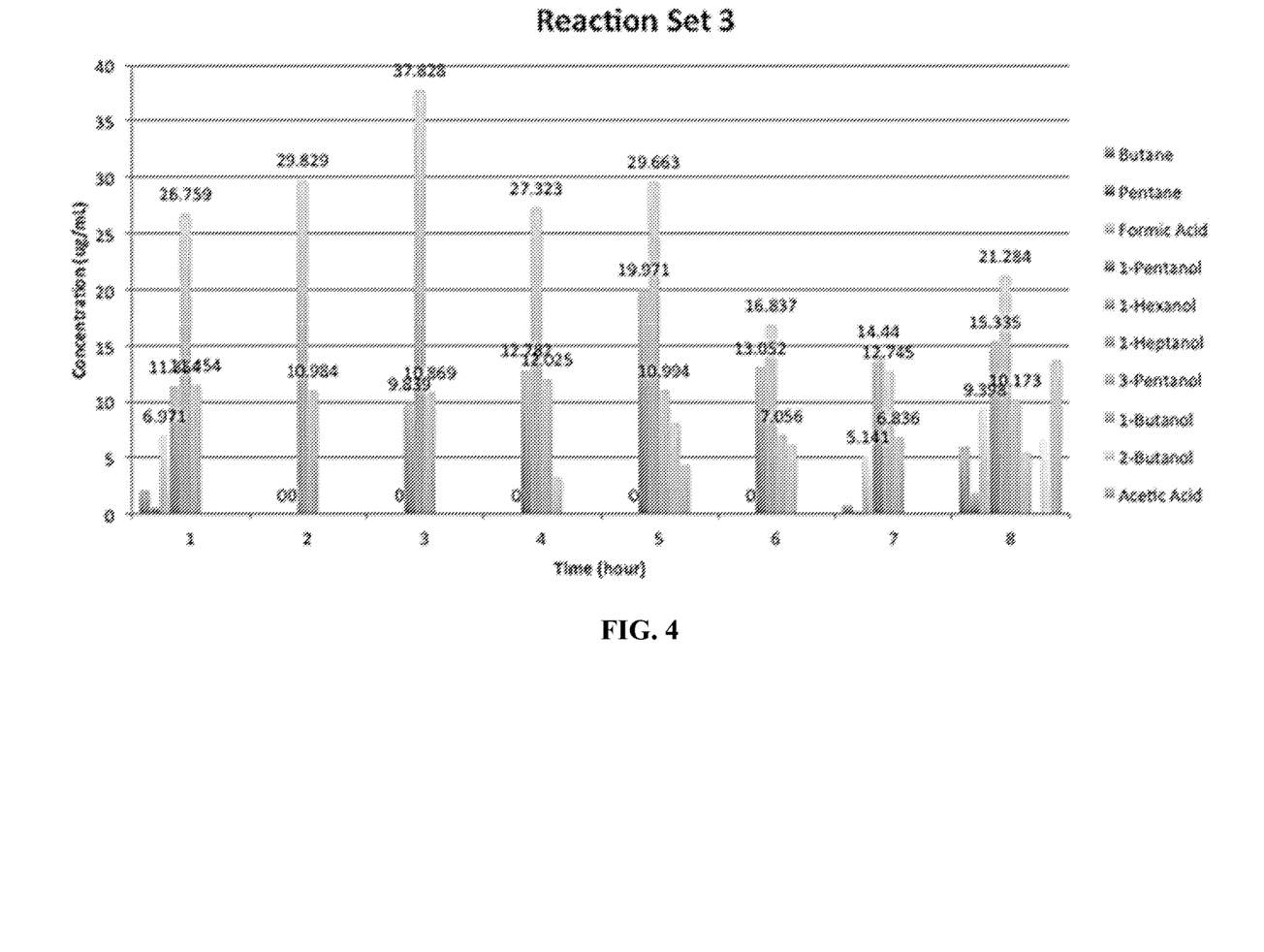
FIG. 4. Illustrates an example of results achieved using Reaction 3 conditions described below.

Reaction 3: Catalyst 260 $Co_{0.5}MoS_2$ (pressure 450 Psi, $H_2$/CO:0.8/1.0, temperature 300 degree C.). Three alcohols that were predominately detected at these reaction conditions, 1-pentanol, 1-hexanol, and 1-heptanol. 1-Hexanol gave the higher concentration for this 8 hour period. 3-Pentanol was detected at concentrations lower than 7 μg/mL during the 4th-7th hour and then again at the 8th hour. 1-Butanol showed up at 4.4 μg/mL on the 5th hour. Concentration of 6.744 μg/mL of 2-Butanol showed up in the last hour.

Figure 5:
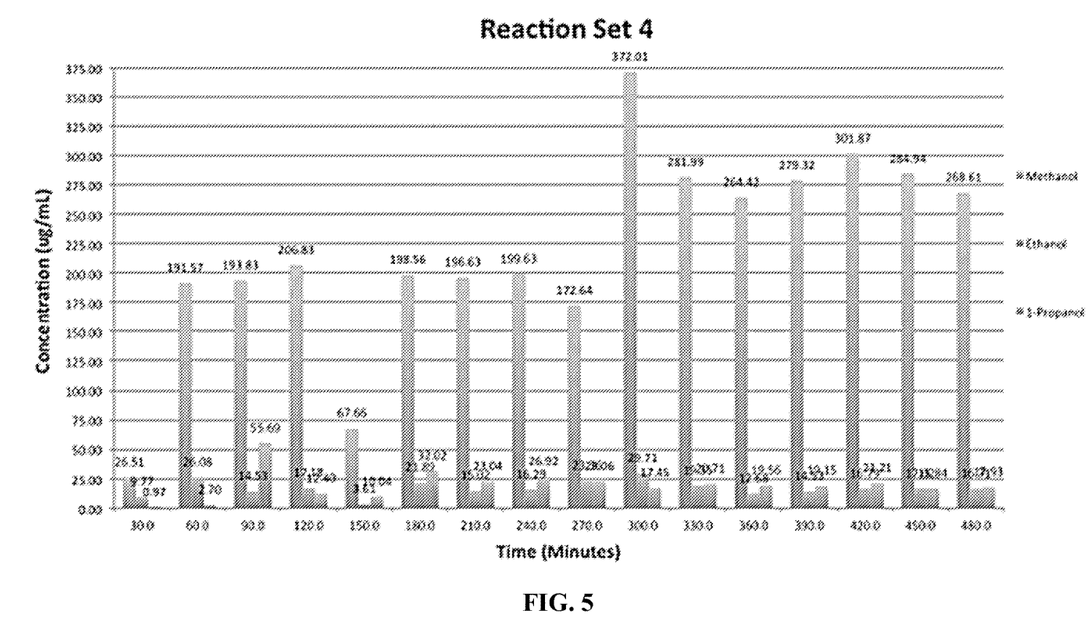
FIG. 5. Illustrates an example of results achieved using Reaction 4 conditions described below.

Reaction 4: Catalyst 260 $Co_{0.5}MoS_2$ (pressure 450 psi, temperature 300 degree C., $H_2$/CO ratio 1/1, pretreatment 2 hours, GSHV=5000mL/(gcat*hr)). The highest concentration during an 8 hour period was methanol. 1-propanol and ethanol were also detected in this reaction.

Figure 6:
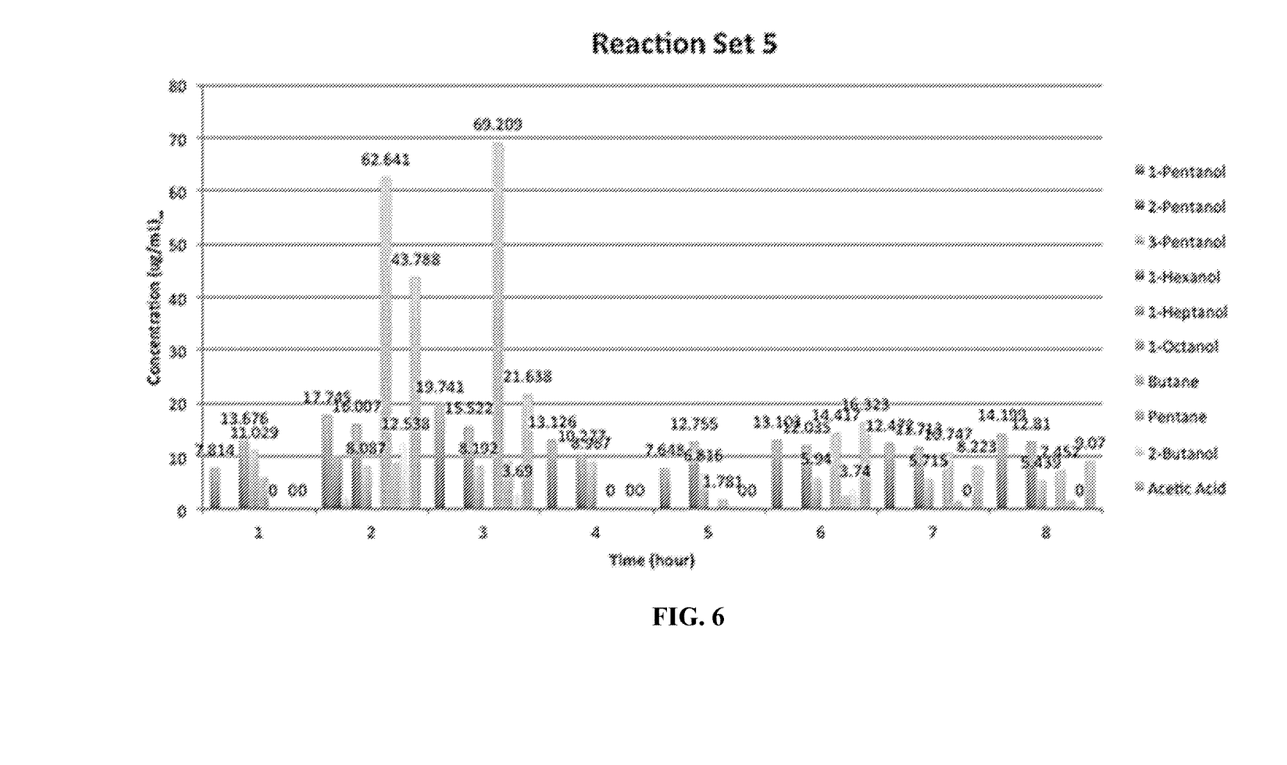
FIG. 6. Illustrates an example of results achieved using Reaction 5 conditions described below.

Reaction 5: Catalyst 260 $Co_{0.5}MoS_2$ (pressure 500 psi, $H_2$/CO:1.0/1.0, temperature 300 degree C.). This reaction produced more products than the previous four reaction sets. According to literature optimal FT reactions are carried out at pressures of around 500 psi. The three alcohols predominately present are 1-pentanol, 1-hexanol, and 1-heptanol. 1-hexanol was the alcohol produced at higher concentrations. Higher pressure also gave way to products such as butane, pentane, and acetic acid, these products were not as abundant in reactions with lower pressure. 1-Octanol was present at the 1st hour at ~6.0 μg/mL, and 2-butanol was present on the $2^{nd}$, $3^{th}$, and $6^{th}$ hour at concentrations below 12.5 μg/mL.

Figure 7:
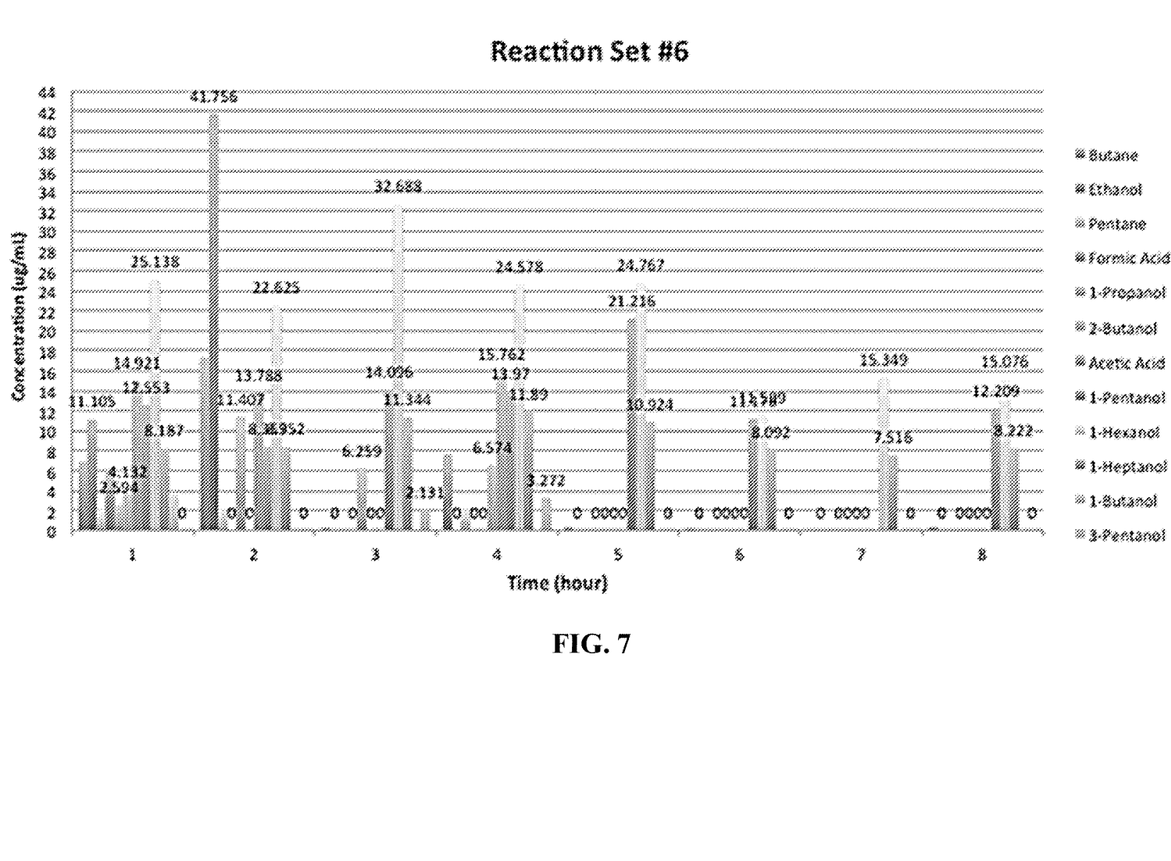
FIG. 7. Illustrates an example of results achieved using Reaction 6 conditions described below.

Reaction 6: Catalyst 260 $Co_{0.5}MoS_2$ (H2/CO:0.8/1, pressure 500 psi, temperature 300 degree C.). The 6th reaction gave the most alcohol products. The main alcohol products were 1-pentanol, 1-hexanol and 1-heptanol. 1-Hexanol gave the higher concentrations for the 8 hour period. Alcohols that were also present but not consistent or present each hour were ethanol, 1-propanol, 2-butanol, 1-butanol, and 3-pentanol. This reaction set resulted in higher concentrations for the shorter chained alcohols. FT literature states that when when CO is in excess to $H_2$ ratio, it allows a better selectivity towards alcohols.

Reaction 7: Before beginning reactions, catalyst was passivated using 10 mL/min hydrogen flow for 2 hours at P=1.4 MPa (200 psi) and T=400° C. Alcohol products were analyzed using gas chromatography equipped with a flame ionization detector. CO conversion was measured using gas chromatography equipped with a thermal conductivity detector.

Figure 8:
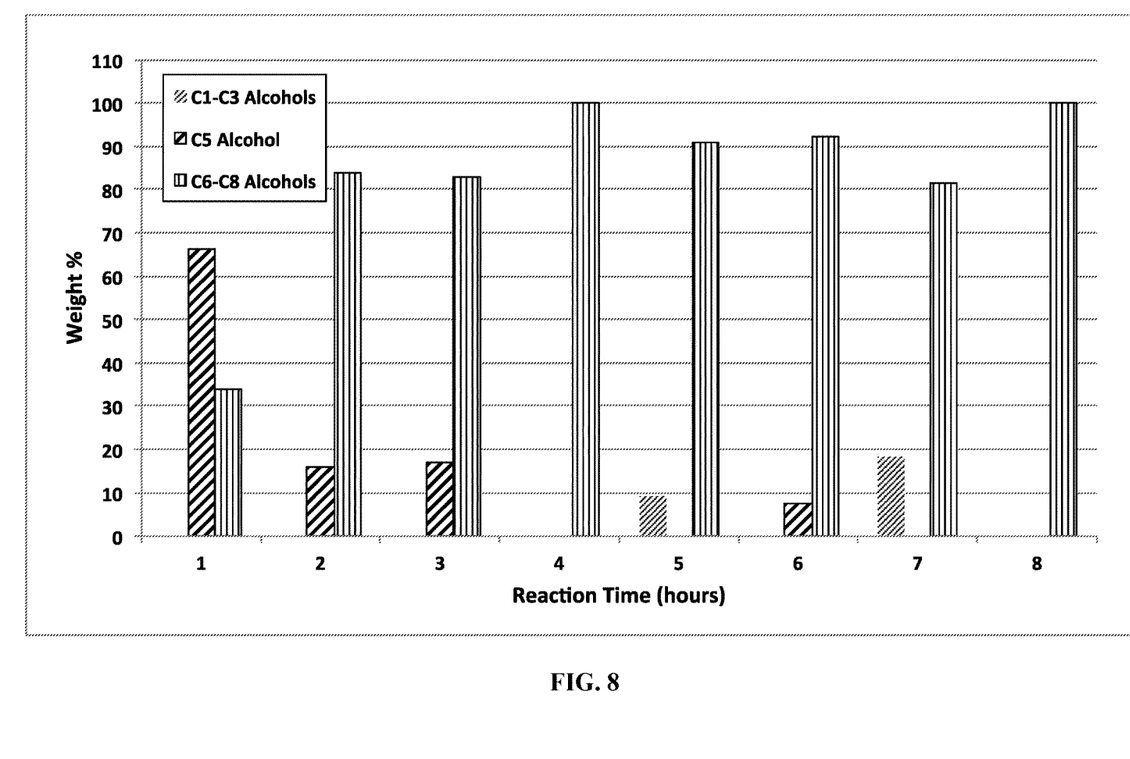
FIG. 8. Illustrates an example of results achieved using Reaction 7 conditions described below.

When a synthesis gas (H2:CO=0.8 molar ratio, 17 mL/min total flow rate) was flowed over a $Cs_3Co_5MoS_2$ catalyst (P=3.1 MPa (450 psi), T=300° C.) for eight hours, the product distribution predominantly showed alcohols that were 6-8 carbons in length (C6-C8) after the first hour. From the product distribution, the catalyst was stabilized after the first hour and continued to produce C6-C8 alcohols up to eight hours. (FIG. 8)

Reaction 8: Before beginning reactions, catalyst was passivated using 10 mL/min hydrogen flow for 2 hours at P=1.4 MPa (200 psi) and T=400° C. Alcohol products were analyzed using gas chromatography equipped with a flame ionization detector. CO conversion was measured using gas chromatography equipped with a thermal conductivity detector.

Figure 9:
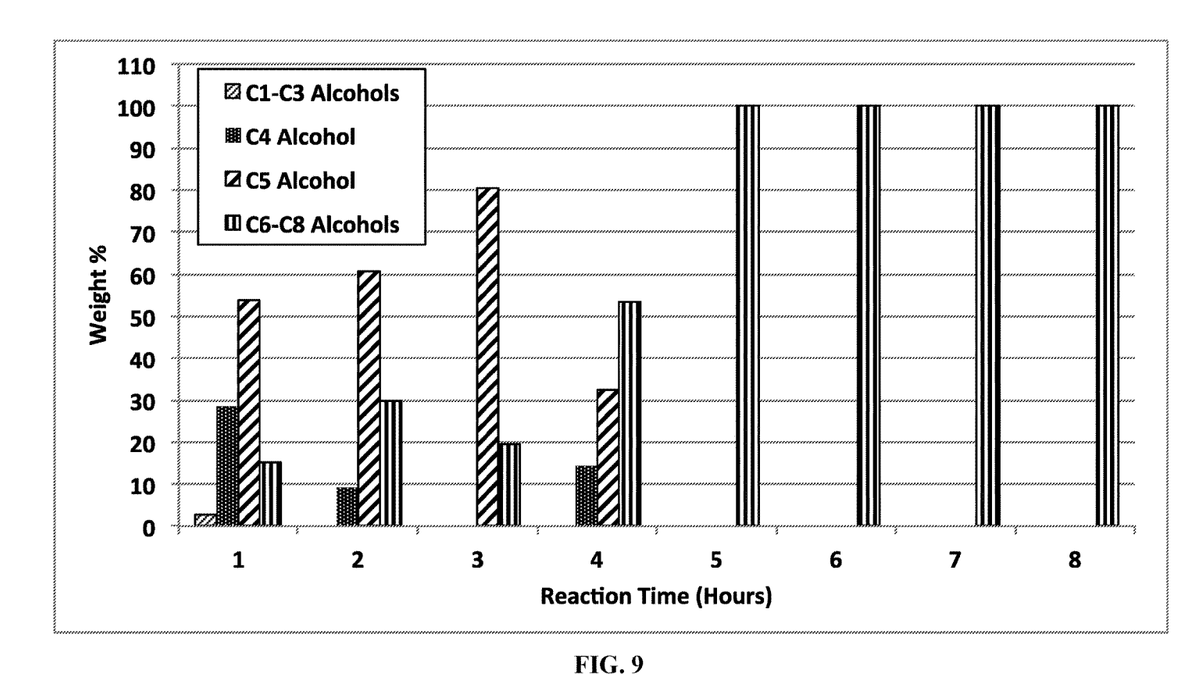
FIG. 9. Illustrates an example of results achieved using Reaction 8 conditions described below.

The $Cs_3MoS_2$ catalyst (reactions performed at the same conditions) required up to four hours to stabilize but then produced only C6-C8 alcohols. (FIG. 9)

Reaction 9: Before beginning reactions, catalyst was passivated using 10 mL/min hydrogen flow for 2 hours at P=1.4 MPa (200 psi) and T=400° C. Alcohol products were analyzed using gas chromatography equipped with a flame ionization detector. CO conversion was measured using gas chromatography equipped with a thermal conductivity detector.

Figure 10:
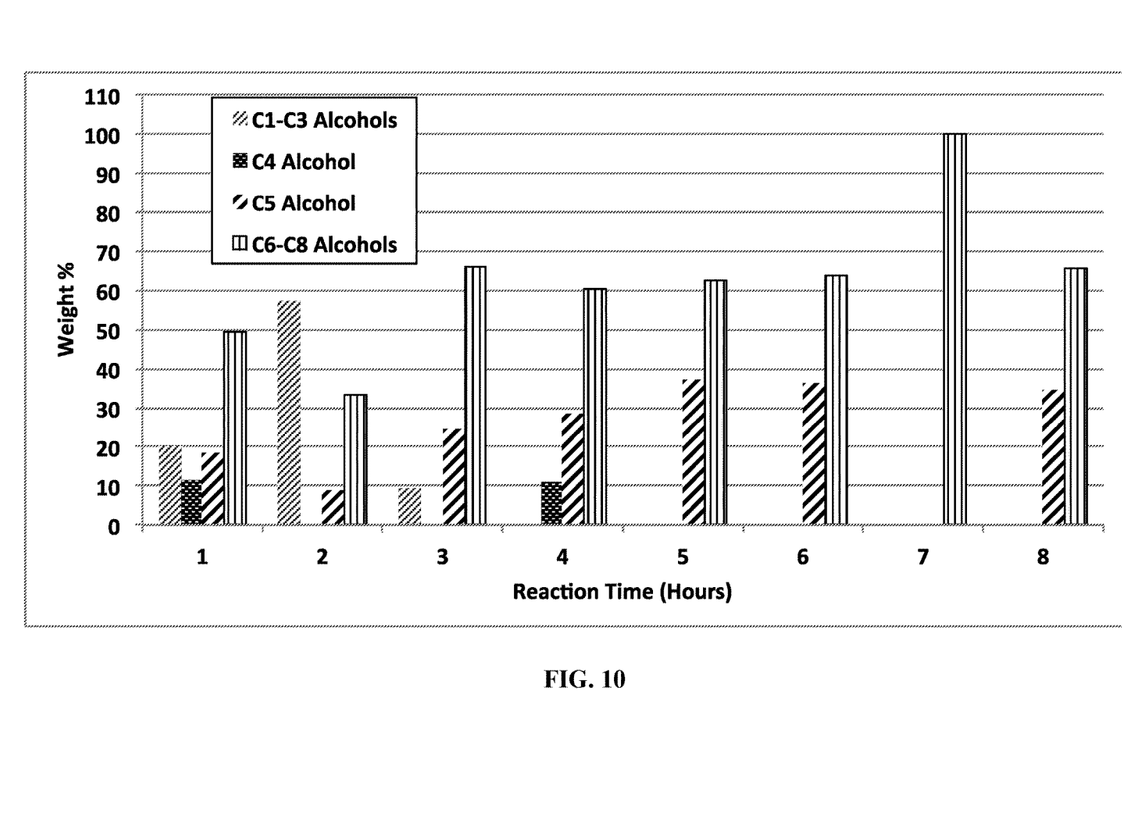
FIG. 10. Illustrates an example of results achieved using Reaction 9 conditions described below.

The $Co_{0.5}MoS_2$ catalyst (reactions performed at the same conditions) produced C6-C8 alcohols and also C4 alcohol (butanol), showing less selectivity for C6-C8 alcohols. (FIG. 10)

Alcohols that were detected in every reaction set were mainly, 1-Pentanol, 1-Hexanol, and 1-Heptanol. Smaller chain alcohol were also present but not at the same consistency as the alcohols mentioned above. Based on the data collected certain optimal conditions are 500 psi at 0.8/1 $H_2$/CO ratio (reaction 6). According to the previous data attained, optimal conditions include $H_2$/CO:0.8/1, 500 Psi, 300 Degrees Celsius, 2 hour pretreatment, 8 hour period. A complete series of alkali promoted $MoS_2$-based catalysts can be tested for FT alcohol attainment.

TABLE 3

| Sample ID | Label | Surface Area (m2/g) |
|---|---|---|
| 231 (2nd Run) | $Cs_3MoS_2$ | 444 |
| 231 (1st Run) | $Cs_3MoS_2$ | 427 |
| 226 | $K_6MoS_2$ | 417 |
| 225 | $K_3MoS_2$ | 268 |
| 229 | $Li_3MoS_2$ | 215 |
| 259 | $K_3Co_{.5}MoS_2$ $2^{nd}$ (Filtered) | 214 |
| 230 | $K_3Co_{.5}MoS_2$ | 70.2 |
| 260 | $CoMoS_2$ | 66.3 |
| 261 | $Cs_3Co_{.5}MoS_2$ | 32.9 |
| 233 | $Li_3Co_{.5}MoS_2$ | 30.5 |

BET confirmed a that the catalyst with a $K_{.6}MoS_2$ ratio had ×2 the surface area of $K_{.3}MoS2$. Two methods of synthesis were performed for $K_{.3}Co_{.5}MoS_2$. Precursors that were filtered showed the surface area was almost ×3 larger. Catalyst that produce alcohols at lower pressures are preferred due to cost considerations.

In certain aspects $Cs_{.3}MoS_2$ with out cobalt can produce alcohols orders of magnitude higher than catalysts that contain cobalt.

Higher surface areas are achieved when precursors have been filtered.

Laboratory reactions were carried out to maximize CO conversion, yet, minimize capital and operating costs within a chemical production facility. Using a central composite statistical design, reaction temperatures (275-350° C.), pressures (2.6-3.1 MPa, and gas hourly space velocities (4,000-7,500) (three levels of each parameter) were tested. The $H_2$/CO molar ratio was 2.0. Percent conversion, X, was calculated on a molar basis X=(moles CO fed to the reactor-moles CO unreacted)/(moles CO fed to the reactor)×100%. Gas hourly space velocity (GHSV) was calculated by the total volume flow rate fed to the reactor divided by the mass of catalyst (presented by mL/($g_{cat}$*hr). Using the laboratory reactor (i.e. single pass tubular reactor), conversions of 12-15% were realized for reactor conditions of T=325° C., P=2.8 MPa (400 psi), and GHSV=7,500. The conversion of CO is equilibrium limited, thus, separation of products, including water, and recycle of unreacted CO and $H_2$ leads to a total calculated conversion of 48-60% (assuming an industrial reactor operated isothermally such as a fluidized bed reactor).

The invention claimed is:

1. A method of synthesizing alkali promoted transition metal sulfide Fischer-Tropsch catalyst using steps comprising of:
   (i) mixing an ammonium tetrathiomolybdate (ATM) precursor compound with an alkali metal compound and molybdenium disulfide in deionized water forming a reaction mixture;
   (ii) heating the reaction mixture at a temperature above 250° C. and at a pressure above 1000 psi for more than 1 hour to form a transition metal sulfide Fischer-Tropsch catalyst; and
   (iii) filtering, washing, and drying the transition metal sulfide Fischer-Tropsch catalyst.

2. Method of claim 1, wherein the ATM precursor, alkali metal, and molybdenium is present at a starting molar ratio of about 5:0.3:1.

3. Method of claim 1, wherein the alkali metal is potassium.

4. Method of claim 1, wherein the ammonium tetrathiomolybdate (ATM) precursor compound is synthesized by steps comprising:
 (i) dissolving heptamolybdate in deionized water,
 (ii) adding ammonium sulfide solution, and
 (iii) heating the solution above 55° C. for 30 minutes with stirring to produce the ammonium tetrathiomolybdate (ATM) precursor compound.

5. A transition metal sulfide Fischer-Tropsch catalyst produced using steps comprising of:
 (i) mixing an ammonium tetrathiomolybdate (ATM) precursor compound with an alkali metal compound and molybdenum disulfide in deionized water forming a reaction mixture;
 (ii) heating the reaction mixture at a temperature above 250° C. and at a pressure above 1000 psi for more than 1 hour to form the transition metal sulfide Fischer-Tropsch catalyst and
 (iii) filtering, washing, and drying the transition metal sulfide Fischer-Tropsch catalyst.

6. The transition metal sulfide Fischer-Tropsch catalyst of claim 5, whererin the alkali metal is cesium, the reaction mixture further comprises cobalt nitrate hexahydrate, and the transition metal sulfide Fischer-Tropsch catalyst is a $Cs_3Co_5MoS_2$ catalyst.

7. A method of synthesizing alkali promoted transition metal sulfide Fischer-Tropsch catalyst using steps comprising of:
 (i) mixing an ammonium tetrathiomolybdate (ATM) precursor compound with an alkali metal compound, cobalt nitrate hexahydrate, and molybdenum disulfide in deionized water to form a reaction mixture;
 (ii) heating the reaction mixture at a temperature above 250° C. at a pressure above 1000 psi for more than 1 hour to form a transition metal sulfide Fischer-Tropsch catalyst; and
 (iii) filtering, washing, and drying the transition metal sulfide Fischer-Tropsch catalyst.

8. The method of claim 7, wherein the ATM precursor, alkali metal, cobalt, and molybdenium is present at a starting molar ratio of 5:0.3:0.3:1.

9. The method of claim 7, wherein the alkali metal is potassium.

10. The method of claim 7, wherein the ammonium tetrathiomolybdate (ATM) precursor compound is synthesized by steps comprising of:
 (i) dissolving heptamolybdate in deionized water,
 (ii) adding ammonium sulfide solution, and
 (iii) heating the solution above 55° C. for 30 minutes with stirring to produce the ammonium tetrathiomolybdate (ATM) precursor compound.

11. A process for converting synthesis gas to hydrocarbons comprising contacting a transition metal sulfide Fischer-Tropsch catalyst with synthesis gas at a pressure 250 to 500 psi and a temperature 250 to 400° C. in order to convert the synthesis gas into hydrocarbons,
 wherein the transition metal sulfide Fischer-Tropsch catalyst is made with a method comprising:
  mixing an ammonium tetrathiomolybdate (ATM) precursor compound with an alkali metal compound and molybdenum disulfide in deionized water forming a reaction mixture;
  heating the reaction mixture at a temperature above 250° C. and at a pressure above 1000 psi for more than 1 hour to form the transition metal sulfide Fischer-Tropsch catalyst and
  filtering, washing, and drying the transition metal sulfide Fischer-Tropsch catalyst.

12. The process of claim 11, wherein the alkali metal is cesium, the reaction mixture further comprises cobalt nitrate hexahydrate, and the transition metal sulfide Fischer-Tropsch catalyst is a $Cs_3Co_5MoS_2$ , $Cs_3MoS_2$, $CsCo_{0.5}MoS_2$, or $Co_{0.5}MoS_2$ catalyst.

13. The process of claim 11, wherein the synthesis gas has a $H_2$:CO ratio of about 0.8.

\* \* \* \* \*

UNITED STATES PATENT AND TRADEMARK OFFICE
CERTIFICATE OF CORRECTION

PATENT NO. : 10,316,254 B2
APPLICATION NO. : 15/522644
DATED : June 11, 2019
INVENTOR(S) : Molina et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 6 days.

Signed and Sealed this
Thirty-first Day of December, 2019

Andrei Iancu
*Director of the United States Patent and Trademark Office*